Oct. 11, 1932.  L. GIUFFRE  1,882,139
DOUGH CUTTING MECHANISM
Filed June 26, 1930
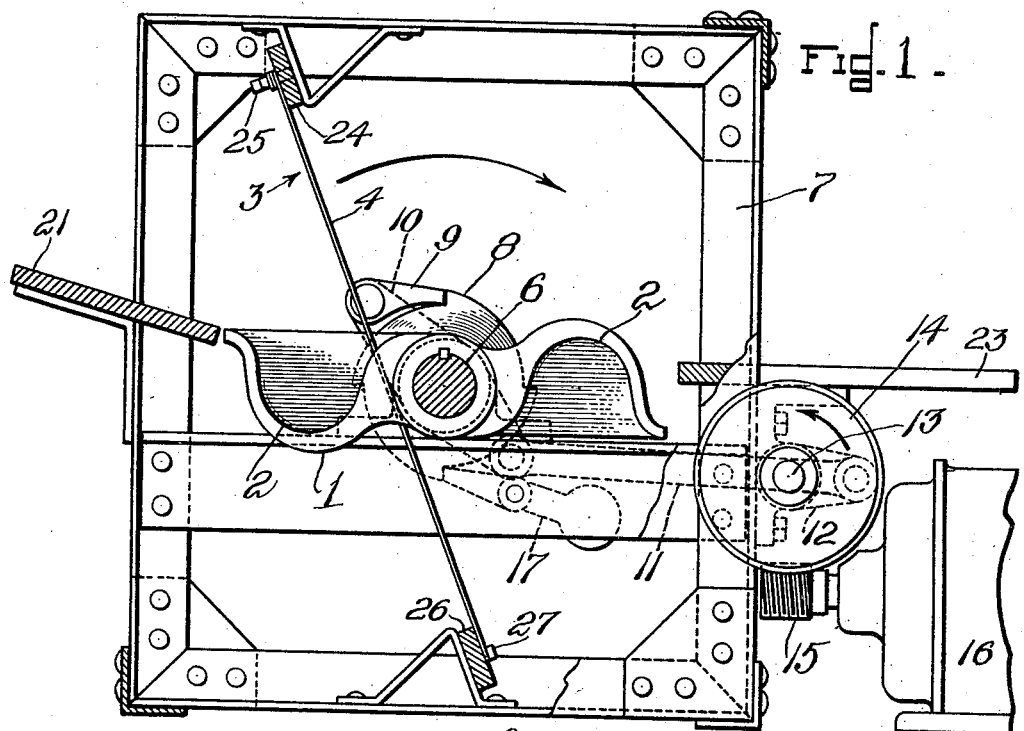
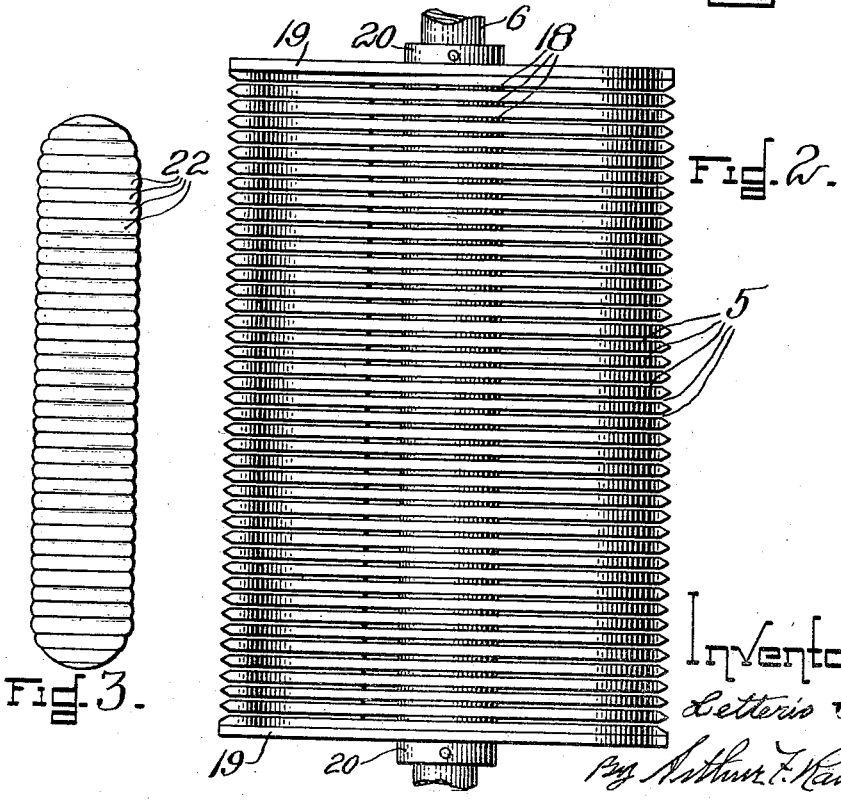
Inventor=
Letterio Giuffre,
By Arthur F. Randall Atty.

Patented Oct. 11, 1932

1,882,139

UNITED STATES PATENT OFFICE

LETTERIO GIUFFRE, OF EAST BOSTON, MASSACHUSETTS

DOUGH CUTTING MECHANISM

Application filed June 26, 1930. Serial No. 463,878.

My invention relates to improvements in the art of making loaves of bread including dough cutting mechanisms for use in connection therewith.

Heretofore loaves of bread have been produced by baking a single homogeneous mass of dough and therefore it was necessary subsequently to use a knife upon the cooked loaf in order to procure a slice thereof, or to reduce the loaf to slices. My invention obviates this use of a knife.

Proceeding in accordance with my invention I first produce a batch of raw dough which is formed into a loaf. This loaf of raw dough is then cut into a plurality of pieces, or slices, by a single cutting operation at the conclusion of which the loaf still exists as a loaf but is constituted by a row of abutting slices or pieces whose abutting sides are flat and parallel. The loaf thus prepared is then cooked.

When a cooked loaf of bread is produced in accordance with my invention, the row of slices, or pieces, are preferably of uniform thickness and adhere to form a single unitary loaf structure after the manner of a batch of biscuits cooked in a single pan but, as with the biscuits, the joints between the individual pieces, or slices, are easily broken so that my new loaf of bread can be readily divided or broken into slices or pieces at said joints without the use of a knife.

As a feature of my invention I have provided a novel dough cutting mechanism by means of which a loaf of raw bread dough can be expeditiously and conveniently operated upon to cut the same into pieces or slices as described above.

Other features of my invention are hereinafter pointed out.

In the accompanying drawing:

Figure 1 is an end elevation, partly broken away and partly in section, of a dough cutting mechanism constructed in accordance with my invention.

Figure 2 is a plan view of the slotted holder element hereinafter referred to.

Figure 3 is an elevation of a loaf of bread produced in accordance with my invention.

The dough cutting mechanism herein illustrated includes a slotted holder 1 formed with a pocket or trough 2 adapted to receive within it a loaf of raw bread dough, and a cutting device, indicated generally at 3, whose cutting elements 4, herein shown as taut lengths of fine metal wire, are adapted to enter the slots of the holder 1 sidewise and to be forced through the loaf of raw dough while the latter is supported by the holder 1.

Obviously this mode of operation may be carried out with either the holder 1 movably supported and the cutting device 3 stationarily supported or with the holder held stationary and the cutting device 3 moved toward and from the latter to cause its cutting wires 4 to pass into and out of the slots 5 of the holder 1.

As herein shown the holder 1 is fixedly mounted upon an axle or shaft 6 journaled in bearings on the frame 7 of the mechanism. At one end thereof the shaft or axle 6 is provided with a ratchet wheel 8 made with four equi-distant teeth co-operating with a gravity pawl 9 pivotally mounted upon one arm of a lever 10 fulcrumed upon the shaft or axle 6. The other arm of this lever 10 is connected by a pitman 11 with a crank arm 12 fast on a shaft 13 journaled in bearings on frame 7.

The shaft 13 also has fixed on it a worm wheel 14 that is continuously driven in the direction of the arrow by a worm 15 fast on the armature shaft of an electric motor 16.

During the operation of the machine the continuously rotating crank arm 12 acts through pitman 11, lever 10 and pawl 9 to rotate the holder 1 step by step in the direction of the arrow adjacent the same, each step movement being to the extent of one quarter of a revolution. A gravity detent 17 co-operating with ratchet wheel 8 prevents reverse movement of the latter and shaft 6.

The holder 1 is built up on the axle 6 and consists of a series of S-shaped members or plates alternating with spacing washers 18, said plates and washers being keyed or otherwise fixed to the shaft or axle 6 so that said plates are held in alinement to form a double holder 1 having two diametrically opposite troughs or pockets 2, one at each side of the axle or shaft 6.

At the opposite ends of the row of S-shaped holder plates I may provide end walls 19, said end walls and the S-shaped plates together with their washers 18 being held against displacement longitudinally on the shaft or axle 6 by collars 20 fastened to the latter.

At the completion of each step movement of the shaft 6 and holder 1, one of the pockets 2 of the latter comes into position, right side up, opposite a table or shelf 21 fixed to the frame 7 upon the approach side of the cutting device 3. While a pocket or trough 2 dwells in this position a molded or shaped loaf of raw dough is transferred from the table or shelf 21 into the same and thereafter when the holder 1 makes its next step movement, the body of raw dough is carried past the cutting device 3, the wires of the latter operating to divide the loaf of dough into a plurality of slices 22, Fig. 3, which remain assembled side by side in abutting engagement.

At the completion of this step movement of the holder 1 the loaded trough, after passing through the cutting device 3, comes to rest in a position above the shaft or axle 6 and the sliced body of dough is removed from the trough intact and transferred to a receiving table 23, or into a baking pan placed upon the same.

When the loaf of bread has been baked the slices 22 adhere one to another but may be individually separated or broken away from the loaf without the use of a knife.

The cutting device 3 is a grid of fine wires 4, the latter being supported in a row, as shown in Fig. 2 where they appear in section within the slots of the holder 1, by means of two bars 24 and 26 forming part of the frame of the machine. The lower end of each wire 4 is permanently anchored to a stud or pin 27 projecting from the bar 26 while the upper end of each wire 4 is engaged with a screw 25 which is adjustable so as to hold the wire 4 under proper tension.

It will be obvious that narrow and thin knife blades may be substituted for the wires 4 if desired.

As shown in Fig. 2 the opposite ends of each S-shaped plate of holder 1 are beveled so that relatively wide entrances are provided for the slots 5 to ensure the passage of the wires into the slots 5 as the holder 1 is rotated. The wires 4 are disposed close to the shaft or axle 6 and tangentially with respect to the latter so that as the holder 1 rotates each trough 2 passes back and forth through the bank of wires 4 from one side thereof to the opposite, said trough being loaded while occupying a position at one side of said bank and unloaded while it occupies a position at the opposite side thereof.

What I claim is:

1. A dough cutting machine comprising a movably supported trough member for holding a body of dough, said member having end walls and being formed between said end walls with a plurality of parallel slots that are disposed at right angles with respect to the trough of said member; a stationarily supported group of cutting devices comprising a row of cutting elements, one for each slot of said trough member; a stationarily supported loading shelf alongside of the path of said trough member; a continuously rotated power driven shaft, and mechanism through which said shaft acts to continually shift said trough member toward and from said shelf so that said member is caused to dwell alternately in receiving position at one extremity of its movement, where it is alongside of said shelf and in delivering position at the opposite extreme of its movement thereby to cause said cutting elements to traverse the slots of said member to divide the dough into a plurality of independent abutting slices.

2. A dough cutting mechanism comprising a rotatably supported trough-shaped holder for a body of dough, said holder having end walls and being formed between said end walls with a plurality of parallel slots that are disposed at right angles with respect to the axis of said holder; a stationarily supported group of cutting devices, comprising a row of tangentially disposed cutting members, one for each slot of said holder; a stationarily supported loading shelf alongside of the path of said holder; a continuously driven shaft, and mechanism through which said shaft acts to continually rotate said holder step-by-step so that said trough is caused to dwell alternately in receiving position at one side of its axis alongside of said shelf and in an inverted delivering position at the opposite side of its axis thereby to cause said cutting members to traverse the slots of said holder and divide the body of dough into a plurality of independent abutting slices.

Signed by me at Boston, Suffolk County, Massachusetts, this 19th day of June, 1930.

LETTERIO GIUFFRE.